US008737197B2

(12) United States Patent
Matityahu et al.

(10) Patent No.: US 8,737,197 B2
(45) Date of Patent: May 27, 2014

(54) SEQUENTIAL HEARTBEAT PACKET ARRANGEMENT AND METHODS THEREOF

(75) Inventors: Eldad Matityahu, Palo Alto, CA (US); Robert Shaw, Los Gatos, CA (US); Dennis Carpio, San Jose, CA (US); Siuman Hui, Millbrae, CA (US); Wei Lian, Fremont, CA (US)

(73) Assignee: Net Optic, Inc., Santa Clara, CA (US)

( * ) Notice: Subject to any disclaimer, the term of this patent is extended or adjusted under 35 U.S.C. 154(b) by 355 days.

(21) Appl. No.: 13/034,732

(22) Filed: Feb. 25, 2011

(65) Prior Publication Data

US 2011/0211441 A1 Sep. 1, 2011

Related U.S. Application Data

(60) Provisional application No. 61/308,867, filed on Feb. 26, 2010.

(51) Int. Cl.
*H04L 12/26* (2006.01)
*H01L 43/10* (2006.01)
*H04L 29/06* (2006.01)

(52) U.S. Cl.
CPC ............. *H01L 43/10* (2013.01); *H04L 63/1416* (2013.01)
USPC .......................................... 370/217; 370/242

(58) Field of Classification Search
CPC ..................................................... H04L 43/10
USPC ............................................................. 370/217
See application file for complete search history.

(56) References Cited

U.S. PATENT DOCUMENTS

| 4,802,161 | A | 1/1989 | Byars et al. |
| 5,173,794 | A | 12/1992 | Cheung et al. |
| 5,539,727 | A | 7/1996 | Kramarczyk et al. |
| 5,550,802 | A | 8/1996 | Worsley et al. |

(Continued)

FOREIGN PATENT DOCUMENTS

| EP | 2091199 | 8/2009 |
| JP | 2001-197066 A | 7/2001 |

(Continued)

OTHER PUBLICATIONS

10/100/1000 Bypass Switch Implementation, Oct. 17, 2007, pp. 2.*

(Continued)

*Primary Examiner* — Hassan Kizou
*Assistant Examiner* — Tejis Daya
(74) *Attorney, Agent, or Firm* — IPSG, P.C., Intellectual Property Law (57) ABSTRACT

An arrangement in a network tap for monitoring state of a monitoring system is provided. The arrangement includes a set of network ports that includes a set of input network ports for receiving data traffic and a set of output network ports for outputting the data traffic from the network tap. The arrangement also includes a monitoring port that is configured to receive the data traffic from the set of network ports and to forward the data traffic onward to the monitoring system. The arrangement further includes a logic component configured for executing a sequential heartbeat diagnostic test. The sequential heartbeat diagnostic test is configured for providing a first set of sequential heartbeat packets for testing and determining the state of the monitoring system. The arrangement yet also includes a logic component for activating one or more events when a failure condition exists for the state of the monitoring system.

17 Claims, 8 Drawing Sheets

(56) References Cited

U.S. PATENT DOCUMENTS

| | | | |
|---|---|---|---|
| 5,648,965 A | 7/1997 | Thadani et al. | |
| 5,696,859 A | 12/1997 | Onaka et al. | |
| 5,710,846 A | 1/1998 | Wayman et al. | |
| 5,774,453 A | 6/1998 | Fukano et al. | |
| 5,781,318 A | 7/1998 | Tremblay | |
| 5,825,775 A | 10/1998 | Chin et al. | |
| 5,983,308 A | 11/1999 | Kerstein | |
| 6,041,037 A | 3/2000 | Nishio et al. | |
| 6,272,113 B1* | 8/2001 | McIntyre et al. | 370/248 |
| 6,389,550 B1 | 5/2002 | Carter | |
| 7,275,100 B2 | 9/2007 | Yamagami | |
| 7,362,761 B2 | 4/2008 | Chen | |
| 7,594,095 B1 | 9/2009 | Sae-Koe | |
| 2001/0040870 A1 | 11/2001 | Ohmori et al. | |
| 2002/0003592 A1 | 1/2002 | Hett et al. | |
| 2002/0026374 A1 | 2/2002 | Moneymaker et al. | |
| 2002/0032880 A1 | 3/2002 | Poletto et al. | |
| 2002/0073199 A1 | 6/2002 | Levine et al. | |
| 2002/0087710 A1 | 7/2002 | Aiken et al. | |
| 2002/0146016 A1 | 10/2002 | Liu et al. | |
| 2002/0176355 A1 | 11/2002 | Mimms et al. | |
| 2002/0180592 A1 | 12/2002 | Gromov | |
| 2003/0112760 A1 | 6/2003 | Puppa et al. | |
| 2003/0142666 A1 | 7/2003 | Bonney et al. | |
| 2003/0184386 A1 | 10/2003 | Varner et al. | |
| 2003/1021523 | 11/2003 | Manifold, Robert H. | |
| 2004/0008675 A1 | 1/2004 | Basso et al. | |
| 2004/0023651 A1 | 2/2004 | Gollnick et al. | |
| 2004/0062556 A1 | 4/2004 | Kubo et al. | |
| 2004/0085893 A1* | 5/2004 | Wang et al. | 370/216 |
| 2004/0096227 A1 | 5/2004 | Bulow | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1 | 9/2004 | Gordy | |
| 2004/0202164 A1 | 10/2004 | Hooper et al. | |
| 2004/0215832 A1 | 10/2004 | Gordy et al. | |
| 2005/0005031 A1 | 1/2005 | Gordy et al. | |
| 2005/0060535 A1 | 3/2005 | Bartas | |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0231367 A1 | 10/2005 | Bellantoni | |
| 2005/0257262 A1 | 11/2005 | Matityahu et al. | |
| 2005/0271065 A1 | 12/2005 | Gallatin et al. | |
| 2006/0002292 A1 | 1/2006 | Chang et al. | |
| 2006/0083268 A1 | 4/2006 | Holaday et al. | |
| 2006/0083511 A1 | 4/2006 | Edmunds et al. | |
| 2006/0153092 A1 | 7/2006 | Matityahu et al. | |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002755 A1* | 1/2007 | Matityahu et al. | 370/242 |
| 2007/0002769 A1 | 1/2007 | Matityahu et al. | |
| 2007/0064917 A1 | 3/2007 | Matityahu et al. | |
| 2007/0081549 A1 | 4/2007 | Cicchetti et al. | |
| 2007/0081553 A1 | 4/2007 | Cicchetti et al. | |
| 2007/0121499 A1 | 5/2007 | Subhasis et al. | |
| 2007/0171966 A1 | 7/2007 | Light et al. | |
| 2007/0174492 A1 | 7/2007 | Light et al. | |
| 2007/0211682 A1 | 9/2007 | Kim et al. | |
| 2007/0213862 A1 | 9/2007 | Chang et al. | |
| 2007/0253329 A1 | 11/2007 | Rooholamini et al. | |
| 2008/0014879 A1 | 1/2008 | Light et al. | |
| 2008/0049627 A1 | 2/2008 | Nordin | |
| 2008/0072291 A1 | 3/2008 | Carley | |
| 2008/0214108 A1 | 9/2008 | Beigne et al. | |
| 2009/0040932 A1* | 2/2009 | Matityahu et al. | 370/241 |
| 2009/0041051 A1 | 2/2009 | Matityahu et al. | |
| 2010/0014605 A1 | 1/2010 | Geile et al. | |
| 2010/0146113 A1 | 6/2010 | Matityahu et al. | |

FOREIGN PATENT DOCUMENTS

| | | |
|---|---|---|
| JP | 2006-148686 A | 6/2006 |
| KR | 10-2004-0058415 A | 7/2004 |
| WO | WO-02/19642 A1 | 3/2002 |
| WO | WO-2004/012163 A2 | 2/2004 |
| WO | WO 2005/043838 A1 | 5/2005 |

OTHER PUBLICATIONS

"International Preliminary Report on Patentability", PCT Application No. PCT/US2011/026160, Mailing Date: Sep. 7, 2012.

"International Preliminary Report on Patentability", PCT Application No. PCT/US2011/026162, Mailing Date: Sep. 7, 2012.

"International Preliminary Report on Patentability", PCT Application No. PCT/US2011/026165, Mailing Date: Sep. 7, 2012.

"International Search Report", PCT Application No. PCT/US2011/026160, Mailing Date: Nov. 24, 2011.

"Written Opinion", PCT Application No. PCT/US2011/026160, Mailing Date: Nov. 24, 2011.

"International Search Report", PCT Application No. PCT/US2011/026162, Mailing Date: Nov. 30, 2011.

"Written Opinion", PCT Application No. PCT/US2011/026162, Mailing Date: Nov. 30, 2011.

"International Search Report", PCT Application No. PCT/US2011/026165, Mailing Date: Nov. 30, 2011.

"Written Opinion", PCT Application No. PCT/US2011/026165, Mailing Date: Nov. 30, 2011.

* cited by examiner

| CONDITION | COUNTER | COUNTER RULE |
|---|---|---|
| SIMULATE TCP SESSION FROM PORT 302 | COUNTER A 360 | TX = + 1<br>RX = RESET TO 0 |
| SIMULATE CONDITION FOR A FIRST SECURITY POLICY | COUNTER B 362 | TX = +1<br>RX = -1 |
| SIMULATE CONDITION FOR A SECOND SECURITY POLICY | COUNTER C 364 | TX = +1<br>RX = -1 |
| SIMULATE TCP SESSION FROM PORT 304 | COUNTER D 366 | TX = + 1<br>RX = RESET TO 0 |
| SIMULATE CONDITION FOR A THIRD SECURITY POLICY | COUNTER E 368 | TX = + 1<br>RX = RESET TO 0 |
| SIMULATE CONDITION FOR A FOURTH SECURITY POLICY | COUNTER F 370 | TX = + 1<br>RX = RESET TO 0 |
| CONDITION N | COUNTER N | COUNTER RULE N |

| FAILURE CONDITION | EVENT(S) |
|---|---|
| COUNTER 360 >3 | SWITCH TO BYPASS MODE AND NOTIFY OPERATOR |
| ALL COUNTERS FOR PATH 330 >6 | SWITCH TO BYPASS MODE AND NOTIFY OPERATOR/ADMINISTRATOR |
| COUNTER 362 >4 | NOTIFY OPERATOR |
| COUNTER 364 > 2 AND COUNTER 362 >2 | EMAIL OPERATOR |
| ALL COUNTERS FOR PATH 332 >4 | SWITCH TO BYPASS MODE |
| COUNTER 366 >3 | SEND WARNING TO OPERATOR |
| FAILURE CONDITION N | EVENT N |

SEQUENTIAL HEARTBEAT PACKET ARRANGEMENT AND METHODS THEREOF

PRIORITY CLAIM

The present invention claims priority under 35 U.S.C. 119(e) to the following commonly owned provisionally filed patent application entitled "Sequential Heartbeat Packet Arrangement and Methods Thereof," U.S. Application No. 61/308,867, filed on Feb. 26, 2010, by inventors Matityahu et al., all of which is incorporated herein by reference.

CROSS REFERENCE TO RELATED APPLICATIONS

The present invention is related to the following applications, all of which are incorporated herein by reference:

Commonly assigned application entitled "Communications Network Tap with Heartbeat Monitor," filed on Jul. 1, 2005 by Matityahu et al. (application Ser. No. 11/174,238);

Commonly assigned application entitled "iBypass High Density Device and Methods Thereof," filed on even date herewith by Matityahu et al application Ser. No. 13/034,733, which claims priority under 35 U.S.C. 119(e) to a commonly owned provisionally filed patent application entitled "iBypass High Density Device and Methods Thereof," U.S. Application No. 61/308,868, filed on Feb. 26, 2010, by inventors Matityahu, all of which is incorporated herein by reference; and Commonly assigned application entitled "Dual Bypass Module and Methods Thereof," filed on even date herewith by Matityahu et al application No. 13/034,736, which claims priority under 35 U.S.C. 119(e) to a commonly owned provisionally filed patent application entitled "iBypass High Density Device and Methods Thereof," U.S. Application No. 61/308,868, filed on Feb. 26, 2010, by inventors Matityahu, all of which is incorporated herein by reference.

BACKGROUND OF THE INVENTION

In today society, a company may depend upon its network to be fully functionally in order to conduct business. To ensure the vitality of the company, the network may have to be protected from external attacks (such as virus attacks, malware attacks, etc.). Accordingly, the network may be monitored to ensure reliable operation, fault detection, timely mitigation of potentially malicious activities and the like. One method for monitoring the network includes the installation of an inline network tap and one or more monitoring systems (such as an intrusion prevention system, an intrusion detection system, a firewall, a packet sniffer, and the like).

Figure 1A:
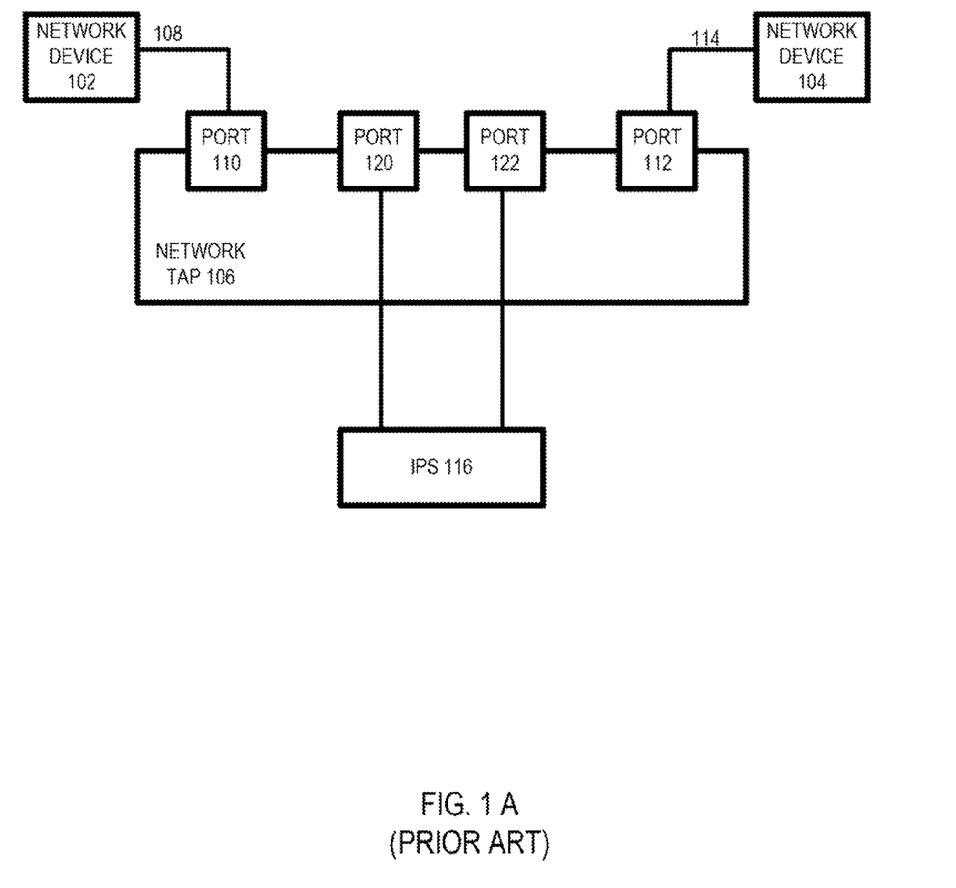
FIG. 1A shows a simple diagram of a network environment with an intrusion prevention system.

To facilitate discussion, FIG. 1A shows a simple diagram of a network environment with a monitoring system, such as an intrusion prevention system (IPS). Consider the situation wherein, for example, a network tap 106 may be employed to gather information about data traffic flowing between two network devices (such as network device 102 and network device 104). In other words, data traffic may flow from network device 102 along a path 108 through network tap 106 (into a port 110 and out of a port 112) along a path 114 to network device 104. In a full-duplex network, network tap 106 may also be configured to monitor data traffic flowing from network device 104 to network device 102 (from port 112 to port 110).

To protect itself, a company may install a monitoring system, such as an intrusion prevention system (IPS) 116. In the aforementioned example, data traffic may flow through IPS 116 before being forwarded onward. In an example, data traffic coming from network device 102 may flow into port 110 then out of a port 120 to IPS 116. Data traffic may then flow from IPS 116 back to network tap 106 via a port 122 before being sent onward along path 114 to network device 104. Similarly, data traffic coming from port 104 may also be flowing though IPS 116 (path includes port 112-port 122-IPS 116-port 120-port 110).

However, malfunction may also occur resulting in the network being unprotected. To ensure that IPS 116 is able to receive and transmit the data traffic, a diagnostic test may be performed to determine the condition of IPS 116. The diagnostic test includes inserting a unique data packet, known as a heartbeat packet, into the network data traffic flowing to IPS 116. IPS 116 is considered to be working properly if the heartbeat packet is received by IPS 116 and sent back to network tap 106 within a predefined period.

Consider the situation wherein, for example, a diagnostic test is being performed to determine the condition of IPS 116. In a typical diagnostic test, the user may define two parameters. The first parameter may be the time interval (e.g., every one second) for sending a heartbeat packet. The second parameter may be the set of fail conditions. In an example, the diagnostic test may be considered to have failed if network tap 106 fails to receive back from IPS 116 three consecutive heartbeat packets. Both of these parameters may be user-configurable and may vary depending upon the network condition and/or network hardware.

Figure 1B:
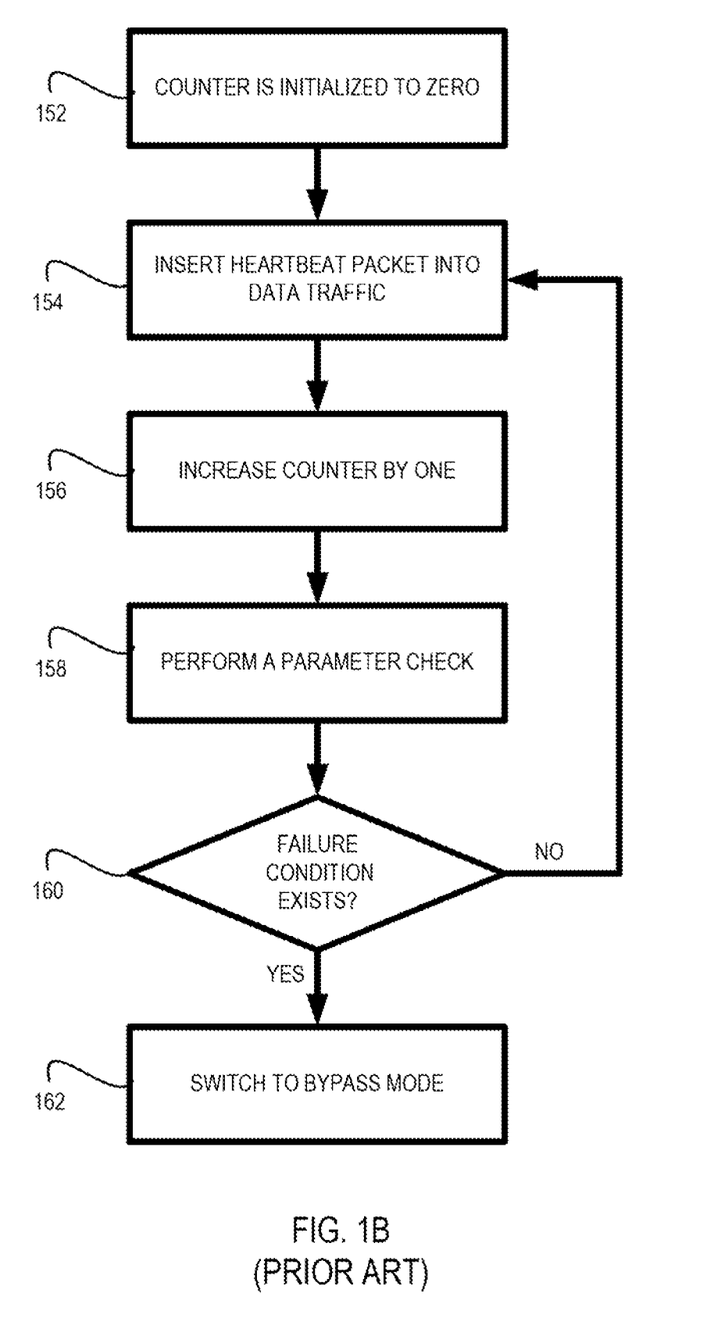
FIG. 1B shows a simple flow chart illustrating a method for performing a diagnostic test.

To facilitate the discussion, FIG. 1A will be discussed in relation to FIG. 1B, which shows a simple flow chart illustrating a method for performing a diagnostic test.

Before executing the diagnostic test, a counter may be initialized to zero (step 152).

At a next step 154, a heartbeat packet may be inserted into the data traffic and sent from a network tap 106 to an IPS 116 via a port 120.

At a next step 156, the counter may be increased by one. The counter may be increased by one each time a heartbeat packet is sent and the counter may be reset to zero each time the heartbeat packet is received back from IPS 116. In other word, if the heart beat packet is sent back to network tap 106 via a port 122, the counter may be reset to zero.

At a next step 158, the system of network tap 106 performs a parameter check. A parameter check may include checking to see if the predefined time interval has passed. If the time interval has passed, another heartbeat packet may be sent. Another parameter check may include determining if the one of the fail conditions has been met. In this example, one of the fail conditions is three consecutive heartbeat packets not being received back by network tap 106.

At a next step 160, the system makes a determination if a fail condition exists. If a fail condition does not exist, the system returns to step 154 to continue the diagnostic test. However, if a fail condition exists, network tap 106 is switched from a normal mode to a bypass mode and the data traffic is rerouted (step 162). In other words, data traffic is no longer routed through IPS 116.

Although the single heartbeat diagnostic test may provide a method for identify a condition in which the data traffic may not be properly protected, other conditions may exist that may not be identified through the single heartbeat diagnostic test. Thus, companies continue to seek additional measures to ensure reliable operation, fault detection, and/or timely mitigation of potentially malicious activities.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description is for illustration and to provide examples of different mode of practicing the invention. The description is not meant to be limiting. For example, reference is made to network traffic and packets, while other forms of data and addresses can be used in the invention. Likewise, reference is made to monitoring/security systems, but the invention may be applied toward other components that may benefit from fault detection. The invention is applicable to both wire and optical technologies. In addition, even though the invention may be described using an inline tap example, the invention is not limited to an inline device and may include programmable logic for performing inline and/or span functions.

In accordance with embodiments of the present invention, a sequential heartbeat arrangement and methods are provided for implementing fault detection. Embodiments of the invention include methods for simulating a communication session between a network tap and a monitoring system (such as an intrusion prevention system, an intrusion detection system, a firewall, a packet sniffer, and the like). Embodiments of the invention also include methods for testing operation condition of the monitoring system.

In an embodiment of the invention, methods are provided for determining the condition of a monitoring system (such as an intrusion prevention system, an intrusion detection system, a firewall, a packet sniffer, and the like). In the prior art, a diagnostic test includes the transmission of a single heartbeat packet that is configured to test the condition of the path between the network tap and the monitoring system. In an embodiment of the invention, a sequential heartbeat diagnostic test is provided for identifying conditions that may cause a component, such as the monitoring system, to be faulty.

Unlike the prior art, a sequential heartbeat diagnostic test is configured to send one or more sets of sequential heartbeat packets to determine the state of a monitoring system. Each set of sequential heartbeat packets may be configured to test different conditions/operation/state of a monitoring system. In an example, a sequential heartbeat diagnostic test may include three set of sequential heartbeat packets with the first set of sequential heartbeat packets being configured to test the TCP (transmission control protocol) session, the second set of sequential heartbeat packets being configured to test the first security policy of a monitoring system, and the third set of sequential heartbeat packets being configured to test the second security policy of the monitoring system. As can be appreciated from the foregoing, the number of heartbeat packets and the number of set of sequential heartbeat packets being sent in a sequential heartbeat diagnostic test may vary depending upon the conditions being tested.

In an embodiment of the invention, a counter may be associated with each diagnostic test condition. Each counter may be independent of one another and may be defined by different counter rules. In an example, one counter rule may require a counter to be increased and decreased by one increment each time a heartbeat packet is sent and received, respectively. In another example, another counter rule may require a counter to be increased by one and reset to zero each time a heartbeat packet is sent and received, respectively.

With a sequential heartbeat diagnostic test, an algorithm may be provided to simulate real world conditions in order to determine the true state of a monitoring system. Given the flexibility of the sequential heartbeat diagnostic test, a company can configure the diagnostic test to specifically test the conditions that have the most impact on its network.

The features and advantages of the present invention may be better understood with reference to the figures and discussions that follow.

Figure 2:
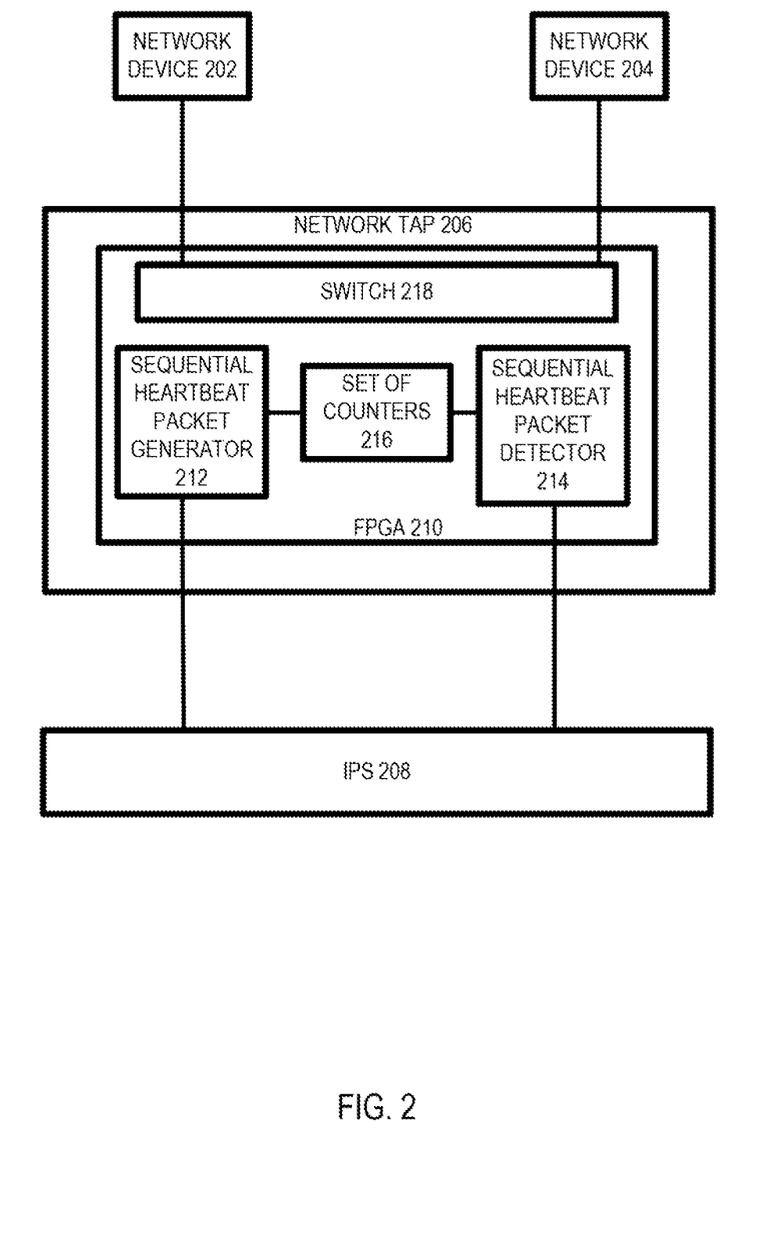
FIG. 2 shows, in an embodiment of the invention a simple block diagram of a secured network environment.

FIG. 2 shows, in an embodiment of the invention a simple block diagram of a secured network environment. The network may include a plurality of network devices (including network devices 202 and 204). These network devices may include, but are not limited to switches, routers, server computers, client computers, and so forth. A network tap 206 may be disposed in-line between the two network devices and may be configured to communicate bi-directionally with each of the network devices. Network tap 206 may also be coupled to a monitoring system, such as an IPS 208.

To ensure the network integrity, a sequential heartbeat diagnostic test may be executed. In an embodiment, network tap 206 may include a logic component, such as a field-programmable gate array (FPGA) 210, which may execute a sequential heartbeat diagnostic test. In an embodiment, FPGA 210 may include a sequential heartbeat packet generator 212 for generating and inserting a set of heartbeat packets into the network data traffic flowing to the monitoring system (IPS 208). FPGA 210, in an embodiment, may also include a sequential heartbeat packet detector 214, which may be configured to identify and remove the set of heartbeat packets from the data traffic when the set of heartbeat packets returns from the monitoring system (IPS 208).

In an embodiment, FPGA 210 may also include a set of counters 216. Each counter may be associated with a diagnostic test condition. As discussed herein, a diagnostic test condition refers to a test condition associated with the monitoring system that may be tested through a heartbeat packet.

In an embodiment, FPGA 210 may also include a switch 218. Switch 218 may be employed to switch network tap 206 from a normal mode (a mode in which the data traffic is being protected by a monitoring system) to a bypass mode (a mode in which the data traffic is being routed through a path that is not secured).

In an embodiment the FPGA 210 may be user configurable, thereby enabling the parameters associated with a sequential heartbeat diagnostic test to be tailored. In an example, the user may define the time interval for generating and sending a set of heartbeat packets. In another example, the user may define the fault conditions.

In an embodiment, FPGA 210 may be managed from a number of device structures via several managing device interfaces. For example, the sequential heartbeat diagnostic test may be configured over a command line interface, a web based device, system interface (such as an SNMP interface) and the like. Each of these interfaces may provide local as well as remote control of the network tap. Communication protocols for these interfaces are generally well-known in the art and may be utilized without limitation and without departing from the present invention.

Figure 3A:
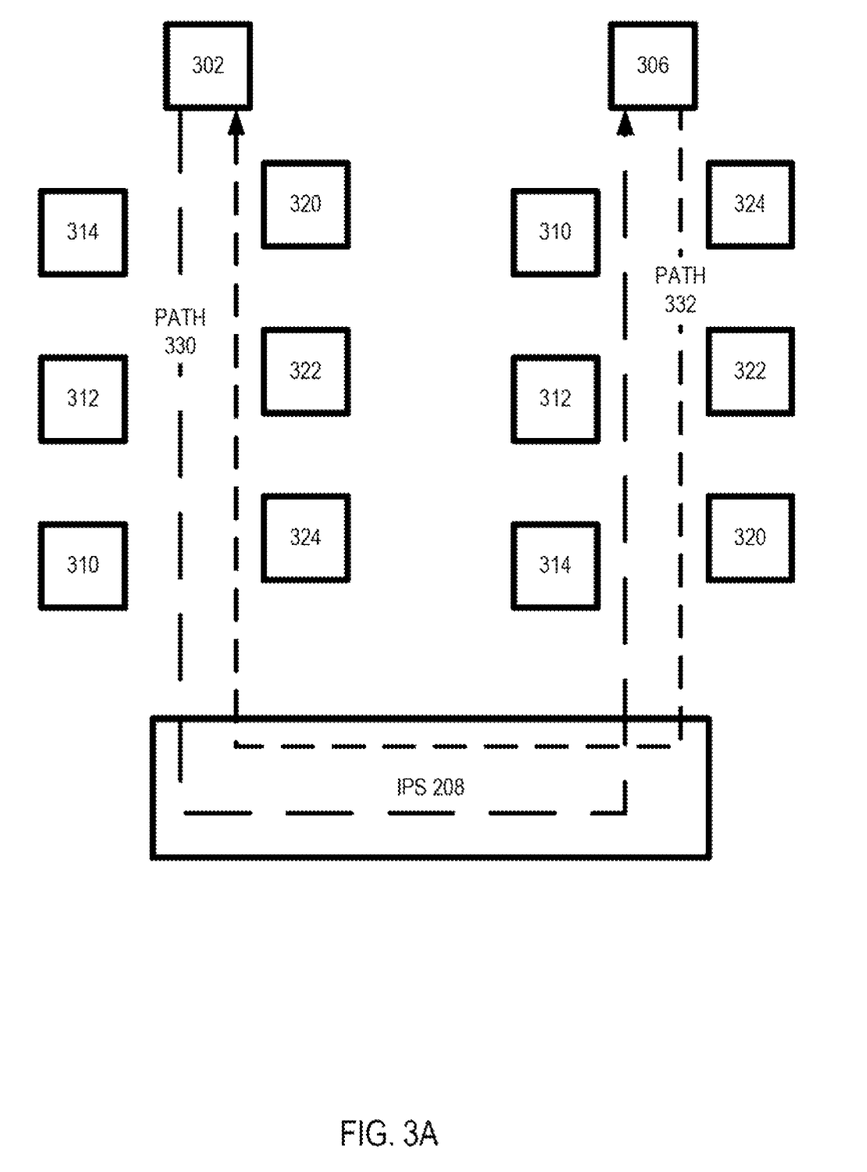
FIG. 3A shows, in an embodiment of the invention, a simple logic block diagram of a sequential heartbeat diagnostic test.

FIG. 3A shows, in an embodiment of the invention, a simple logic block diagram of a sequential heartbeat diagnostic test. Consider the situation wherein, for example, data traffic flowing between two network devices (202 and 204, for example) may be directed through a secured network environment. In an example, data traffic may be flowing out or port 302 through an inline monitoring system (such as IPS 208) back through port 306 before being transmitted onward.

To determine the condition of the inline monitoring system, a sequential heartbeat diagnostic test may be executed. Unlike the prior art, the sequential heartbeat diagnostic test is not designed merely to test the data path between network tap 206 and IPS 208. Instead, the sequential heartbeat diagnostic test may be configured to simulate different real world conditions that data traffic may experience flowing through a secured network environment.

Figure 3B:
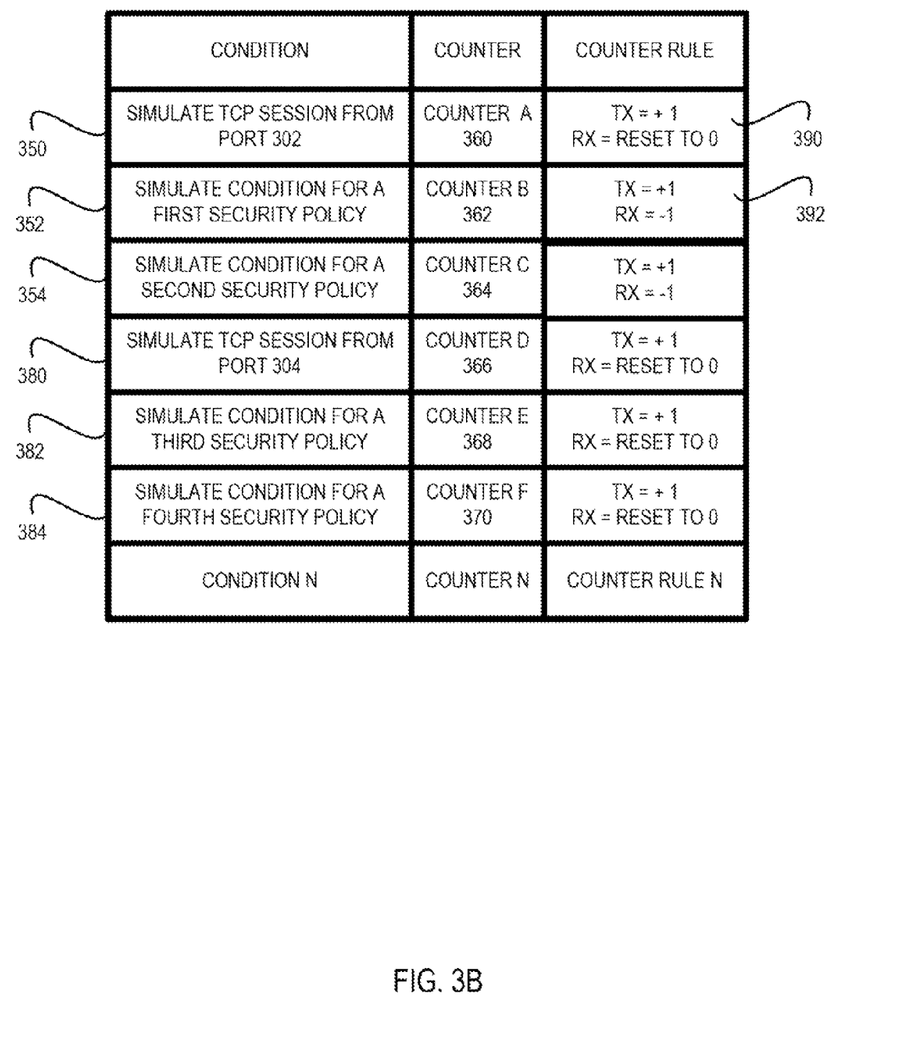
FIG. 3B shows, in an embodiment of the invention, examples of diagnostic test conditions.

Consider the situation wherein, for example, a sequential diagnostic test is configured to test three real-world conditions (as shown in FIG. 38): simulate TCP session between the network tap and IPS 208 (condition 350), simulate condition for a first security policy (condition 352), and simulate condition for a second security policy (condition 354). To perform the test, sequential heartbeat packet generator 212 may generate sets of sequential heartbeat packets (HB 310, HB 312, and FIB 314) and may insert the sets of sequential heartbeat packets into the network data traffic flowing to IPS 208. As mentioned above, the number of heartbeat packets and the number of set of sequential heartbeat packets being sent in a sequential heartbeat diagnostic test may vary depending upon the conditions being tested. For example, each set of sequential heartbeat packets may be configured to test different conditions/operation/state of the monitoring system. In an example, HB 310 may be configured to simulate a TCP session, HB 312 may be configured to simulate a first security policy while FIB 314 may be configured to simulate a second security policy.

In an embodiment, more than one sequential heartbeat diagnostic test may be performed. In an example, the diagnostic test conditions for data traffic flowing from port 302 to port 306 (path 330) may differ from the diagnostic test conditions for data traffic flowing in the reverse direction (path 332). For example, data traffic flowing from port 302 to port 306 may relate to data being uploaded to the company's intranet while data traffic flowing from port 306 to port 302 may relate to data being downloaded from the company's intranet. As a result, the diagnostic test condition for path 330 may focus on preventing malware attack while diagnostic test condition for path 332 may focus on preventing information leak. Accordingly, the sequential heartbeat diagnostic test may be configured to best fit the monitoring system being tested.

In an embodiment, the time interval between transmitting a set of sequential heartbeat packets may vary depending upon each diagnostic test condition. In an example, each diagnostic test condition for path 330 may require a set of sequential heartbeat packets to be sent every one second. In another example, each diagnostic test condition for path 332 may require a set of sequential heartbeat packets to be sent at different intervals. For example, condition 380 (simulating a TCP session) may require a set of sequential heartbeat packets to be sent every one second while the condition 382 and condition 384 (simulating the third security policy and fourth security policy, respectively) may require a set of sequential heartbeat packets to be sent every two seconds.

Figure 3C:
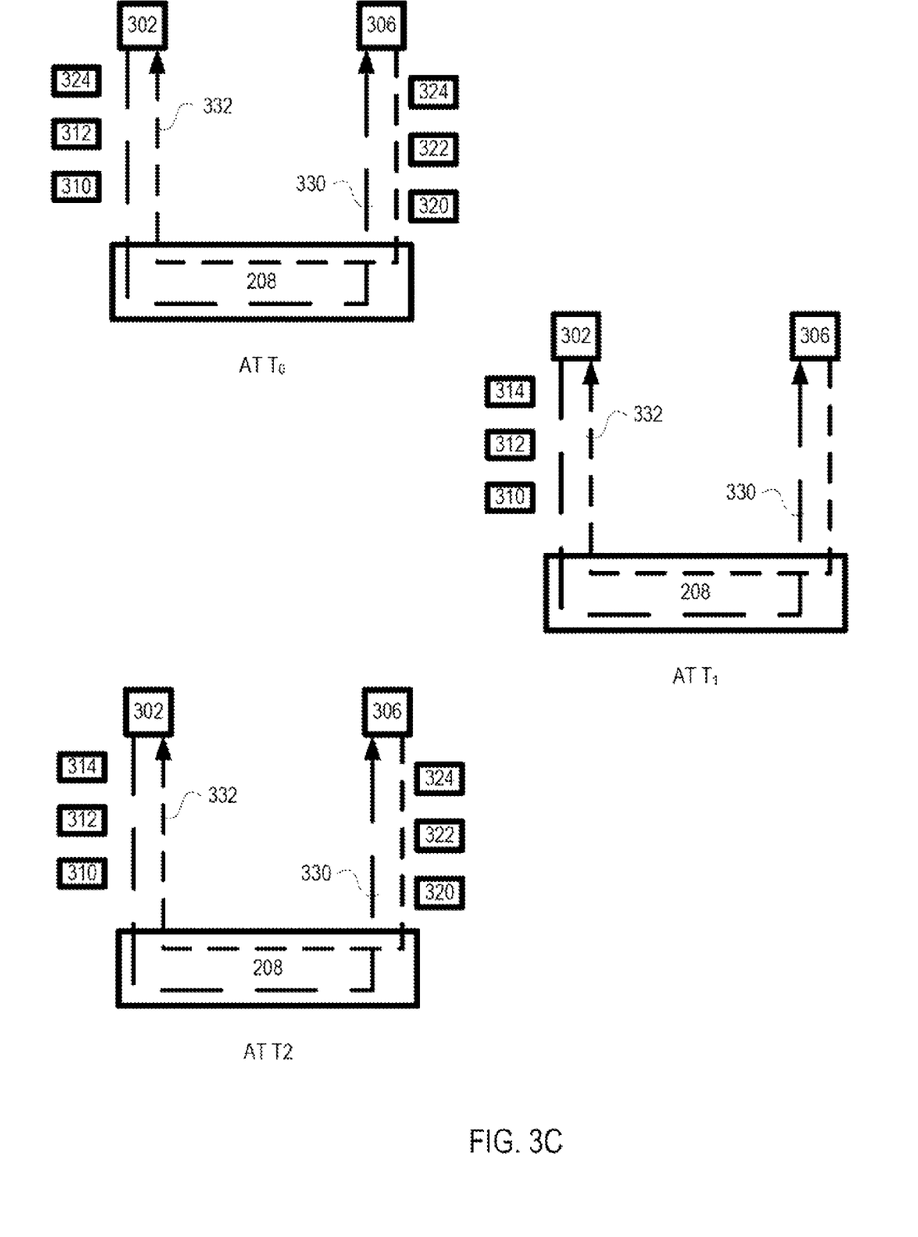
FIG. 3C shows, in an embodiment of the invention, examples of different flow path at different time periods.

To illustrate, FIG. 3C shows two different flow paths at different time intervals. At $t_0$, three set of sequential heartbeat packets (FIB 310, FIB 312, and HB 314) are sent along path 330 and three set of sequential heartbeat packets (HB 320, HB 322, and HB 324) are sent along path 332. One second later, at $t_1$, no heartbeat packets are being sent along path 332 while three set of sequential heartbeat packets continue to be sent along path 330. However, at $t_2$, both paths (330 and 332) are transmitting three set of sequential heartbeat packets each. Accordingly, the number of set of sequential heartbeat packets being transmitted may vary depending upon the time parameter that may have been defined by a user.

In an embodiment of the invention, a counter may be associated with each diagnostic test condition. In an example, counter 360 is associated with condition 350, counter 362 is associated with condition 352, and counter 364 is associated with condition 354. In an embodiment, each counter may be defined by different rules. In an example, counter 362 may be configured to increase by one when sequential heartbeat packet generator 212 generates a set of sequential heartbeat packets and inserts the set of sequential heartbeat packets into the network data traffic being sent to IPS 208. Also counter 362 is configured to be decreased by one when sequential heartbeat packet detector 214 detects the incoming set of sequential heartbeat packets (counter rule 392). In another example, counter 360 may be configured to increase by one when a set of sequential heartbeat packets is sent and may be reset to zero when the set of sequential heartbeat packets is received back by the network tap (counter rule 390).

Figure 4:
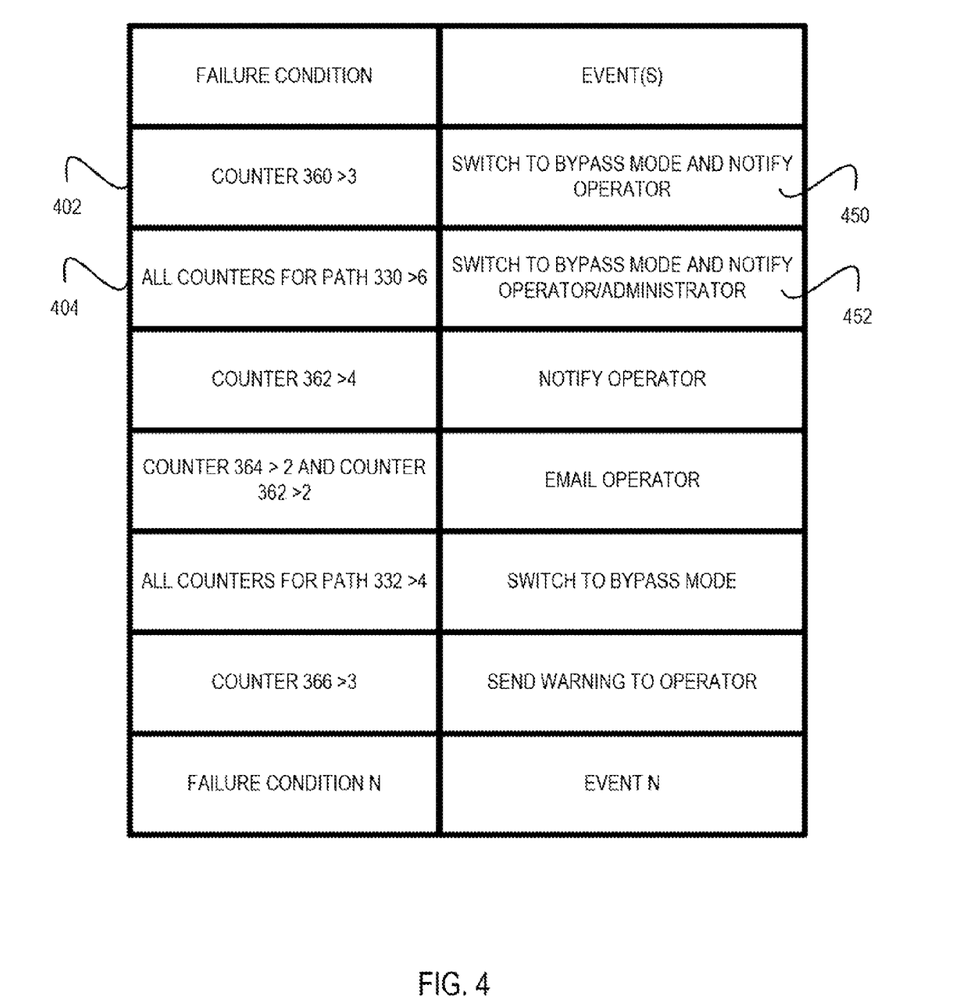
FIG. 4 shows, in an embodiment of the invention, examples of different failure conditions that may be established to determine when an IPS is not functioning properly.

As can be appreciated from the foregoing, the sequential heartbeat diagnostic test can become a complex test that may be employed to test different real-world conditions that may be faced by a company. FIG. 4 shows, in an embodiment of the invention, examples of different failure conditions that may be established to determine when a monitoring system (such as IPS 208) is not functioning properly. In an example, a failure condition may exist if the number of set of sequential heartbeat packets sent that are associated with one counter is greater than a predefined threshold (failure condition 402). For example, three set of consecutive sequential heartbeat packets have been sent for condition 350; however, no set of sequential heartbeat packets has been transmitted back to sequential heartbeat packet detector. In another example, a failure condition may exist if the total number of sets of sequential heartbeat packets for all counters is above a predefined threshold (failure condition 404). For example, if the number of set of sequential heartbeat packets is greater then six than a failure condition exists.

In an embodiment, an event is triggered when a failure condition exists. The event that is associated with a failure condition may vary. In an example, if failure condition 402 exists, the network tap may be switched from a normal mode to a bypass mode and a warning may be sent to the operator (event 450). In another example, if failure condition 404 exists, the network tap may be switched to a bypass mode and notification may be sent to the operator and the administrator (event 452). Accordingly, the type of event that is triggered, as can be appreciated from the foregoing, may depend upon the severity of the failure condition.

Figure 5:
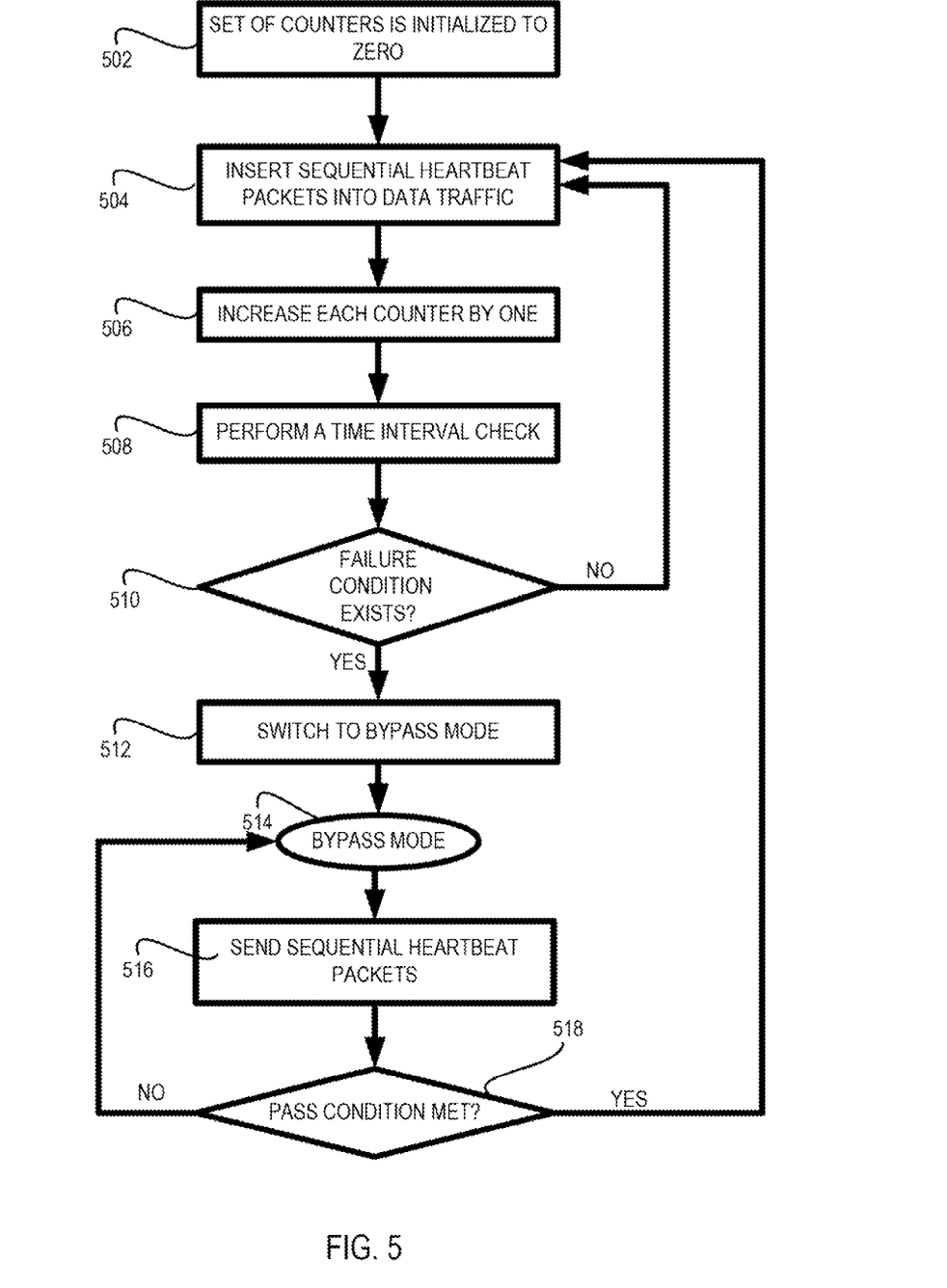
FIG. 5 shows, in an embodiment of the invention, a simple flow chart illustrating a method for implementing a sequential heartbeat diagnostic test.

FIG. 5 shows, in an embodiment of the invention, a flow chart illustrating a method for implementing a sequential heartbeat diagnostic test.

At a first step 502, a set of counters may be initialized to zero. As aforementioned, the number of counters may depend upon the number of diagnostic test conditions. In this example, assume that conditions 350, 352, and 354 are being tested for path 330 and conditions 380, 382, and 384 are being tested for path 332.

At a next step 504, a plurality of a set of sequential heartbeat packet may be inserted into the data traffic and may be sent to IPS 208. In an embodiment, the sequential heartbeat diagnostic test is a dual test. In other words, a diagnostic test may be performed along path 330 and path 332. In this example, at $t_0$, a set of sequential heartbeat packets is sent for each diagnostic test condition. For example, FIB 310, HB 312, and HB 314 are being transmitted along path 330 while HB 320, HB 322, and HB 324 are being transmitted along path 332.

At a next step 506, the counter associate with each diagnostic test condition may be incremented by one. In an example, each of the counter (counters 360, 362, 364, 366, 368, and 370) may be set to one.

At a next step 508, the system may perform a time interval check. If a predefined time interval has passed, another set of sequential heartbeat packets may be sent. In an example, one second has passed. As a result, another set of sequential heartbeat packets is sent for conditions 350-354 but no set of sequential heartbeat packets may be sent for conditions 380, 382 and 384.

At a next step 510, the system makes a determination if a failure condition exists. As can be seen from FIG. 4, the number of failure conditions may vary depending upon a user's configuration. In an example, a financial firm may have more stringent failure conditions than a community network since more sensitive data may be flowing through the financial network.

If a fail condition does not exist, the system returns to step 504 to continue the sequential heartbeat diagnostic test. However, if a fail condition exists, the system may trigger one or more events, at a next step 512. In an example, the network tap may switch from a normal mode to a bypass mode. In another example, notification may be sent to the operator/administrator. The event(s) that may be triggered may depend upon the severity of the failure condition and may be defined by the user.

Steps 508 and 510 are not sequential. In other words, step 508 does not have to occur before step 510 can be executed.

Even if the network tap is in a bypass mode (state 514), set of sequential heartbeat packets may continue to be sent (step 516) by the network tap, in an embodiment. Once the monitoring system (such as IPS 208) is connected back to the network tap, the network tap is switched back to a normal state when the failure condition is no longer valid.

In this document, various implementations may be discussed using an intrusion prevention system, as an example. This invention, however, is not limited to an intrusion prevention system and may include any monitoring and/or security arrangement (e.g., firewall, an intrusion detection system, and the like). Instead, the discussions are meant as examples and the invention is not limited by the examples presented.

Further, in this document, various implementations may be discussed using a network tap, as an example. This invention, however, is not limited to a network tap and may include any network device (e.g., director device, router, switches, iBypass high density device, and the like). Instead, the discussions are meant as examples and the invention is not limited by the examples presented.

As can be appreciated from the foregoing, a sequential heartbeat arrangement and methods thereof are provided for determining the status of an inline monitoring system. By executing a sequential heartbeat diagnostic test, real-world condition simulations may be performed to better analyze the true state of the monitoring system. Thus, an unsecured condition may be quickly identified and preventive/maintenance measures may be implemented to minimize a firm's network exposure to external attack.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement in a network tap for monitoring state of a monitoring system, comprising:

a set of network ports, said set of network ports including a set of input network ports for receiving data traffic and a set of output network ports for outputting said data traffic from said network tap;

a monitoring port, said monitoring port being configured to receive said data traffic from said set of network ports and to forward said data traffic onward to said monitoring system;

a logic component configured for executing a sequential heartbeat diagnostic test, wherein said sequential heartbeat diagnostic test is configured for providing a first set of sequential heartbeat packets for testing and determining said state of said monitoring system, wherein said logic component is a field programmable gate array (FPGA), wherein said FPGA includes a sequential heartbeat packet generator configured for generating and inserting said first set of sequential heartbeat packets into said date traffic flowing into said monitoring system, wherein said FPGA includes a set of counters, said set of counter being associated with said first set of sequential heartbeat packets, wherein said set of counters is compared against a set of failure conditions to determine said state of said monitoring system; and a logic component for activating one or more events when a failure condition exists for said state of said monitoring system.

2. The arrangement of claim 1 wherein said FPGA is user-configurable.

3. The arrangement of claim 2 wherein said FPGA includes a sequential heartbeat detection configured for identifying and removing said first set of sequential heartbeat packets from said data traffic when said first sot of sequential heartbeat packets returns from said monitoring system.

4. An arrangement in a network tap for monitoring state of a monitoring system, comprising:

a set of network ports, said set of network ports including a set of input network ports for receiving data traffic and a set of out network ports for outputting said data traffic from said network tap:

a monitoring port, said monitoring port being configured to receive said data traffic from said set of network ports and to forward said data traffic onward to said monitoring system:

a logic component configured for executing a sequential heartbeat diagnostic test, wherein said sequential heartbeat diagnostic test is configured for providing is first set of sequential heartbeat packets for testing and determining said state of said monitoring system; and a logic component for activating one or more events when a failure condition exists for said state of said monitoring, system, wherein said sequential heartbeat diagnostic test is user-configurable so that said sequential heartbeat diagnostic test is configurable to simulate different real world conditions that data traffic may experience flowing through a secured network environment.

5. The arrangement of claim 4 wherein said sequential heartbeat diagnostic test is Configurable utilizing at least one of a command line interface a web-based device, and a system interface.

6. The arrangement of claim 1 wherein said monitoring system is an intrusion prevention system.

7. The arrangement of claim 1 wherein said failure condition is handled by moving said network tap from a normal mode in which said network traffic flowing through said network tap is protected by said monitoring system to a bypass mode in which said network traffic flowing through said network tap is not protected by said monitoring system.

8. The arrangement of claim 1 wherein a first sequential heartbeat diagnostic test and a second sequential heartbeat diagnostic test are being executed simultaneously.

9. The arrangement of claim 1 wherein said failure condition is user-configurable.

10. The arrangement of claim 1 further including a switch, wherein said switch is configured for moving said network tap from a normal mode in which said network traffic flowing through said network tap is protected by said monitoring system to a bypass mode in which said network traffic flowing through said network tap is not protected by said monitoring system when said failure condition exist.

11. A method for monitoring state of a monitoring system, comprising:

receiving network traffic from a set of network ports; and executing a first sequential heartbeat diagnostic test for determining said state of said monitoring system, wherein said sequential heartbeat diagnostic test is user-configurable so that said sequential heartbeat diagnostic test is configurable to simulate different real world conditions that data traffic may experience flowing through a secured network environment and wherein said first sequential heartbeat diagnostic test includes initializing a set of counters to zero, wherein a first counter of said set of counters is associated with a first diagnostic test condition of a set of diagnostic test conditions, generating a plurality of sets of sequential heartbeat packets, wherein a first set of sequential heartbeat packets of said plurality of sets of heartbeat packets is associated with said first diagnostic test condition, inserting said plurality of sets of sequential heartbeat packets into network traffic flowing between a network tap and said monitoring system, sending said plurality of sets of sequential heartbeat packets to said monitoring system, incrementing said set of counters by one, receiving said network traffic from said monitoring system, detecting and removing said first set of sequential heartbeat packets from said network traffic, analyzing said network traffic flowing from said monitoring system to said network tap to determine if a failure condition exists, and if a failure condition exists, triggering one or more events for handling said failure condition.

12. The method of claim 11 wherein said generating said plurality of sets of sequential heartbeat packets is performed by a sequential heartbeat packet generator.

13. The method of claim 11 wherein said detecting, and removing of said first set of sequential heartbeat packets is performed by a sequential heartbeat packet detector.

14. The method of claim 11 wherein said triggering one or more events for handling said failure condition includes moving said network tap from a normal mode in which said network traffic flowing through said network tap is protected by said monitoring system to a bypass mode in which said network traffic flowing through said network tap is not protected by said monitoring system.

15. The method of claim 11 further including executing a second sequential heartbeat diagnostic test while executing said first sequential heartbeat diagnostic test.

16. The method of claim 11 wherein said failure condition is user-configurable.

17. The method of claim 11 wherein said set of diagnostic test conditions is user-configurable.

\* \* \* \* \*